(12) United States Patent
Jain et al.

(10) Patent No.: US 12,730,961 B2
(45) Date of Patent: Sep. 8, 2026

(54) GENERATING TYPOGRAPHIC DECORATIONS

(71) Applicant: Adobe Inc., San Jose, CA (US)

(72) Inventors: Arushi Jain, Delhi (IN); Praveen Kumar Dhanuka, Howrah (IN)

(73) Assignee: Adobe Inc., San Jose, CA (US)

( * ) Notice: Subject to any disclaimer, the term of this patent is extended or adjusted under 35 U.S.C. 154(b) by 221 days.

(21) Appl. No.: 18/455,159

(22) Filed: Aug. 24, 2023

(65) Prior Publication Data

US 2025/0069293 A1 Feb. 27, 2025

(51) Int. Cl.
*G06T 11/23* (2026.01)
*G06F 40/166* (2020.01)

(52) U.S. Cl.
CPC ............ *G06T 11/23* (2026.01); *G06F 40/166* (2020.01); *G06T 2210/12* (2013.01)

(58) Field of Classification Search
None
See application file for complete search history.

(56) References Cited

U.S. PATENT DOCUMENTS 6,498,608 B1 * 12/2002 Dresevic ............... G06F 40/109 382/242
8,717,366 B2 * 5/2014 Merry ................... G06T 11/203 345/442
2004/0006749 A1 * 1/2004 Fux ......................... G06T 7/001 715/263
2005/0256394 A1 * 11/2005 Hahn ...................... G06F 30/15 600/414
2008/0238927 A1 * 10/2008 Mansfield ............... G06T 11/60 345/467
2009/0027396 A1 * 1/2009 Frisken ................. G06T 11/203 345/442
2011/0188071 A1 * 8/2011 Yoshida .............. G06F 3/03545 358/1.15
2020/0097525 A1 * 3/2020 Dhanuka ............. G06F 16/5838
2022/0188503 A1 * 6/2022 Arora .................... G06F 40/106

FOREIGN PATENT DOCUMENTS

CN 110942064 B * 5/2023 ......... G06K 9/00281

* cited by examiner

*Primary Examiner* — Alicia M Harrington
*Assistant Examiner* — Christine Yera Ahn
(74) *Attorney, Agent, or Firm* — Keller Preece PLLC

(57) ABSTRACT

A system of present disclosure, in one or more embodiments, receives selections of first and second points for a path. The first point is at a first position and the second point is at a second position in a digital design document. The system identifies a glyph of text nearest a location of the first position and determines a geometry of the glyph. The system determines a first parametric value of the geometry of the glyph nearest to the first position and determines a second parametric value of the geometry of the glyph nearest to the second position. The system generates the path between the first position and the second position that follows the geometry of the glyph at a consistent offset relative to the glyph by utilizing the first parametric value and the second parametric value to generate path geometry that follows the geometry of the glyph.

20 Claims, 12 Drawing Sheets

GENERATING TYPOGRAPHIC DECORATIONS

BACKGROUND

Recent years have seen significant improvement in hardware and software platforms for generating and editing computer graphics. For example, developers have created technologies to modify or improve computer graphics platforms to create graphic design images. To illustrate, conventional graphic design systems often provide digital tools to assist designers in creating and modifying graphic designs that include text. More particularly, conventional systems present graphic design tools to designers for integrating text into graphical designs and/or adorning text with designs. Despite these advances, however, many conventional systems continue to demonstrate several deficiencies or drawbacks, particularly in accuracy and efficiency of implementing computing devices.

SUMMARY

This disclosure describes one or more embodiments of systems, methods, and non-transitory computer readable media that solve one or more of the foregoing or other problems in the art with systems for generating graphic paths that mimic glyph curvature. For example, the disclosed system automatically generates a path that matches the curves and/or angles of a glyph's geometry without converting the glyph into an outline. More particularly, the disclosed method detect a glyph of text near a user selection. The disclosed method determines a geometry of the glyph to generate a path having (i) a copy of the glyph geometry or (ii) an offset copy of the glyph geometry.

BRIEF DESCRIPTION OF THE DRAWINGS

This disclosure describes one or more embodiments of the invention with additional specificity and detail by referencing the accompanying figures. The following paragraphs briefly describe those figures, in which.

DETAILED DESCRIPTION

Figure 1:
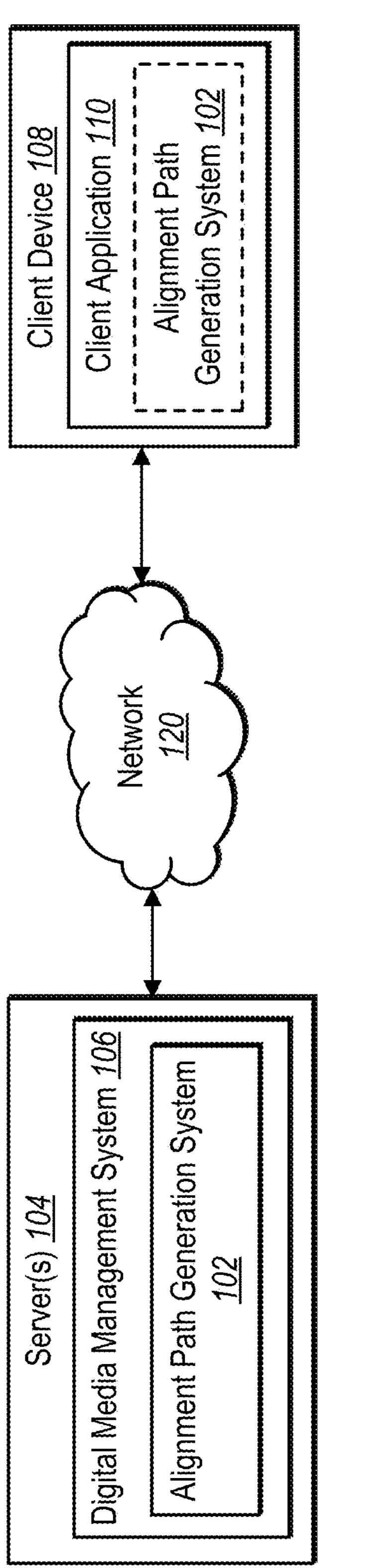
FIG. 1 illustrates a schematic diagram of an example system environment for implementing an alignment path generation system in accordance with one or more embodiments of the present disclosure.

This disclosure describes one or more embodiments of an alignment path generation system that efficiently and accurately generates an alignment path or parallel offset path for part of a glyph's geometry. As discussed above, conventional systems face a variety of technical deficiencies in creating paths that align with the edges of glyphs in text. Conventional systems are often inaccurate. To illustrate, existing systems often require designers to manually create alignment paths that align with a given glyph geometry. Additionally, existing systems often require designers to precisely cut the alignment path at a desired point. Existing systems rely on the manual precision of designers to create alignment curves having identical or offset geometries. Accordingly, alignment paths generated by existing systems are often incapable of accurately replicating or aligning with glyph geometries.

In addition to technical deficiencies with accuracy, existing systems are often inefficient. In particular, some existing systems attempt to improve the accuracy of creating alignment paths by copying segments of glyphs in text. For example, existing systems copy and paste segments of an existing glyph, outline or vectorize the glyph, and use a scissor tool or delete option to cut the glyph geometry at desired points. However, these systems are often computationally expensive. For example, existing systems require designers to enter several inputs including selecting a desired glyph and selecting copy and paste operations for the desired glyph. Furthermore, existing systems expend additional computing resources to convert the glyph from a raster-based image into an outline- or vector-based format. These existing systems are often inefficient when copying Bezier curves and other geometries found in glyphs.

The alignment path generation system, of the present disclosure, interactively replicates the curvature, or any glyph geometry, based on limited user input. Moreover, the alignment path generation system generates an alignment path that follows the glyph geometry within text without converting the text into outline form. In one or more implementations, the alignment path generation system detects a glyph that is nearest a designer's first click point. Based on detecting the glyph, the alignment path generation system performs path snapping for successive click points to replicate or closely follow the glyph geometry.

In one or more implementations, the alignment path generation system receives a first selection via a user interface of a client device at a first position in a digital design document comprising text. The alignment path generation system identifies a glyph of the text nearest a location of the first position and determines a geometry of the glyph. In one or more embodiments, the alignment path generation system determines a first parametric value of the geometry of the glyph nearest to the first position. The alignment path generation system receives a second selection via the user interface of the client device at a second position in the digital design document. In some embodiments, the alignment path generation system determines a second parametric value of the geometry of the glyph nearest to the second position. The alignment path generation system generates a path between the first position and the second position that follows the geometry of the glyph at a consistent offset relative to the glyph based on the geometry of the glyph based on the first parametric value and the second parametric value.

As mentioned, the alignment path generation system identifies a glyph nearest a location of the first position. In some implementations, the alignment path generation system leverages text metadata to efficiently identify the glyph. Furthermore, the alignment path generation system, in one or more implementations, determines a first position that is on, or within, an edge of a glyph. In other examples, the alignment path generation system determines the first position at an offset from the edge of the glyph.

The alignment path generation system also determines a geometry of the glyph. For example, the alignment path generation system extracts a glyph outline to access information regarding the glyph geometry. In one or more embodiments, the alignment path generation system accesses parametric values for curves or other geometries of the glyph. For instance, the alignment path generation system determines a first parametric value of the geometry of the glyph nearest to the first position.

In some implementations, the alignment path generation system determines a second position based on a second selection. In one or more embodiments, based on determining that the second position is within a tolerance of the glyph, the alignment path generation system determines a second parametric value of the geometry of the glyph nearest to the second position.

The alignment path generation system efficiently generates a path between the first position and the second position that follows the geometry of the glyph. As mentioned, in some examples, the alignment path generation system generates a path directly on an edge of the glyph. In such instances, the alignment path generation system generates a duplicate path having a path geometry that follows the geometry of the glyph. In other implementations, the alignment path generation system generates an offset path at a consistent offset relative to the glyph. In such instances, the alignment path generation system generates a modified path geometry for the generated path to accommodate the offset.

As suggested above, embodiments of the alignment path generation system provide certain improvements or advantages over conventional systems. For example, the alignment path generation system more accurately generates alignment paths for various glyph geometries. In contrast to conventional systems that merely provide tools to manually create a path, the alignment path generation system provides automatic intent detection and automatic snapping to text geometry. Specifically, by generating paths based on parametric values rather relying upon user input, the alignment path generation system generates more accurate paths with less user input and faster generation times.

Furthermore, the alignment path generation system improves efficiency relative to existing systems. In some examples, the alignment path generation system provides an intuitive and interactive system for generating paths. Instead of requiring designers to make multiple selections and operations to create a path, the alignment path generation system provides an interactive system that requires limited input (e.g., user selections) from the designer. Furthermore, the alignment path generation system enables designers to flexibly snap a path with geometries of multiple glyphs without any additional interactions.

Additional detail regarding the object-specific-modification system will now be provided with reference to the figures. For example, FIG. 1 illustrates a schematic diagram of an example system environment for implementing an alignment path generation system 102 in accordance with one or more embodiments. An overview of the alignment path generation system 102 is described in relation to FIG. 1. Thereafter, a more detailed description of the components and processes of the alignment path generation system 102 is provided in relation to the subsequent figures.

As shown, the environment includes server(s) 104, client device 108, a digital media management system 106, and a network 120. Each of the components of the environment communicate via the network 120, and the network 120 is any suitable network over which computing devices communicate. Example networks are discussed in more detail below in relation to FIG. 10.

As mentioned, the environment includes the client device 108. The client device 108 is one of a variety of computing devices, including a smartphone, a tablet, a smart television, a desktop computer, a laptop computer, a virtual reality device, an augmented reality device, or another computing device as described in relation to FIG. 10. Although FIG. 1 illustrates a single instance of the client device 108, in some embodiments, the environment includes multiple different client devices, each associated with a different user. The client device 108 communicates with the server(s) 104 and/or the digital media management system 106 via the network 120. For example, the client device 108 transmits one or more digital design documents to the digital media management system 106 and provides information to server(s) 104 indicating client device interactions (e.g., selections in a digital design document comprising text).

As shown in FIG. 1, the client device 108 includes a client application 110. In particular, the client application 110 is a web application, a native application installed on the client device 108 (e.g., a mobile application or a desktop application), or a cloud-based application where all or part of the functionality is performed by the server(s) 104. The client application 110 presents or displays information to a user, including digital design documents comprising text and generated paths generated using the alignment path generation system 102.

As further illustrated in FIG. 1, the environment includes a digital media management system 106. In particular, the digital media management system 106 receives, generates, modifies, provides, stores, manages, and/or distributes digital media. For example, the digital media management system 106 stores digital media such as digital images, digital documents, or digital videos, provides the digital media for display, edits the digital media, and manages access to the digital media to authorized devices. In some cases, the digital media management system 106 utilizes a database to store or maintain digital media.

As illustrated in FIG. 1, the environment includes the server(s) 104. In some embodiments, the server(s) 104 communicates with the client device 108 to transmit and/or receive data via the network 120. In some embodiments, the server(s) 104 comprises a distributed server where the server(s) 104 includes a number of server devices distributed across the network 120 and located in different physical locations. The server(s) 104 comprise a content server, an application server, a communication server, a web-hosting server, a multidimensional server, or a machine learning server.

As further shown in FIG. 1, the server(s) 104 also includes the alignment path generation system 102 as part of the digital media management system 106. For example, as discussed in greater detail below, the alignment path generation system 102 generates paths that align with glyph geometries within a digital design document. More particularly, the alignment path generation system 102 receives user selections indicating positions within the digital design document, identifies one or more target glyphs, determines geometries of the one or more target glyphs, and generates paths that align with the geometries of the one or more target glyphs.

In one or more embodiments, the server(s) 104 includes all, or a portion of, the alignment path generation system 102. For example, the alignment path generation system 102 operates on the server(s) 104 to generate modified digital images. In certain cases, the client device 108 includes all or part of the alignment path generation system 102. For example, the client device 108 generates, obtains (e.g., download), or utilizes one or more aspects of the alignment path generation system 102, such as a path that aligns with the geometries of one or more glyphs. Indeed, in some implementations, as illustrated in FIG. 1, the alignment path generation system 102 is located in whole, or in part, on the client device 108. For example, the alignment path generation system 102 includes a web hosting application that allows the client device 108 to interact with the server(s) 104. To illustrate, in one or more implementations, the client device 108 accesses a web page supported and/or hosted by the server(s) 104.

Although FIG. 1 illustrates a particular arrangement of the environment, in some embodiments, the environment has a different arrangement of components and/or has a different number or set of components altogether. For instance, in some embodiments, the alignment path generation system 102 is implemented by (e.g., located entirely or in part on) the client device 108. In addition, in one or more embodiments, the client device 108 communicates directly with the alignment path generation system 102 at the server(s) 104, bypassing the network 120.

As mentioned, in one or more embodiments, the alignment path generation system 102 generates paths that align with glyph geometries. FIG. 2 illustrates the alignment path generation system 102 generating a path between a first position and a second position that follows the geometry of a glyph in accordance with one or more embodiments of the present disclosure.

Figure 2A:
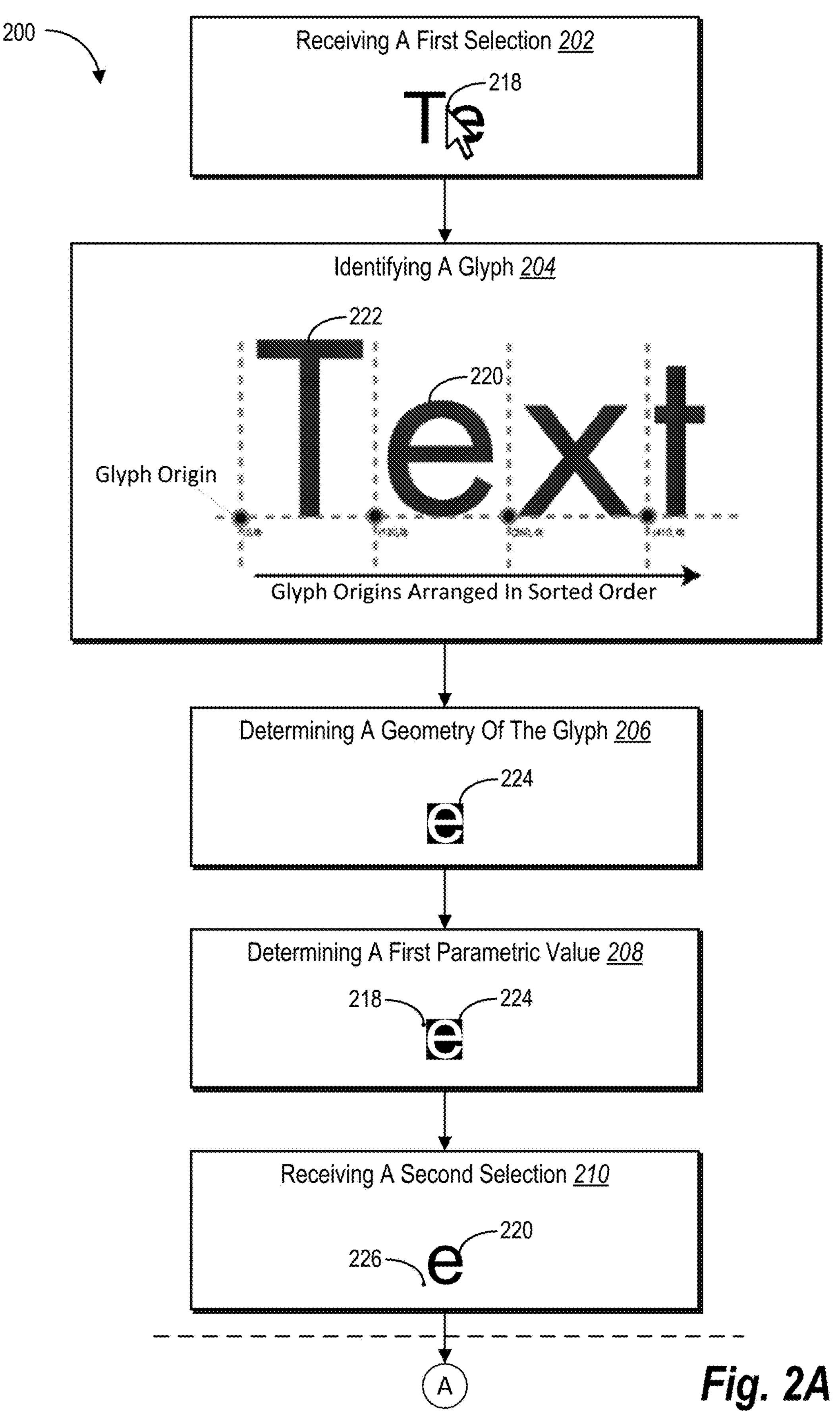
FIGS. 2A-2B illustrate generating a path that follows the geometry of a glyph in accordance with one or more embodiments of the present disclosure.
Figure 2B:
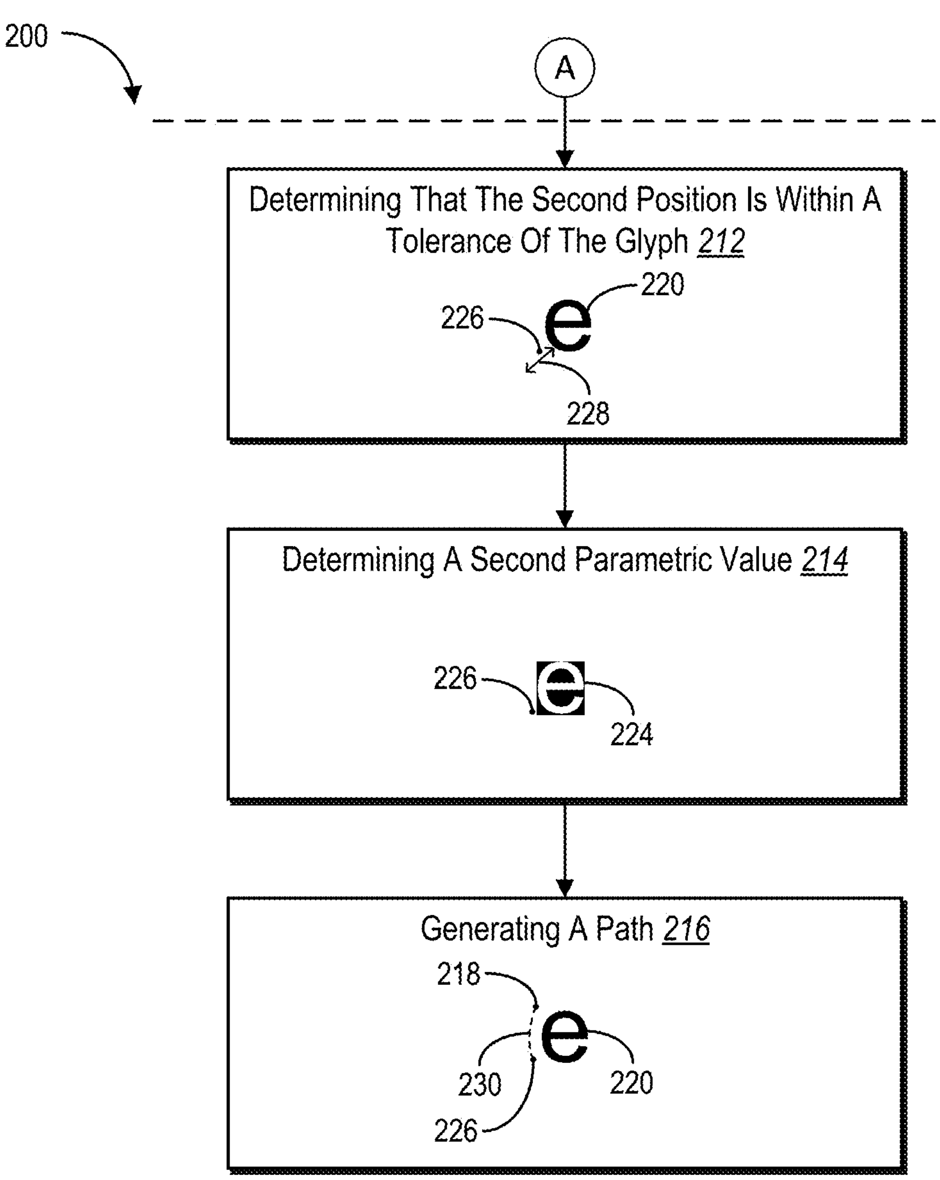

As mentioned, in one or more embodiments, the alignment path generation system 102 generates a path connecting a first position and a second position that follows a geometry of a glyph. FIGS. 2A-2B illustrate the alignment path generation system 102 performing a method 200 comprising generating a path that follows the geometry of a glyph in accordance with one or more embodiments of the present disclosure.

As shown in FIG. 2, the alignment path generation system 102 performs receives a first selection 202. In particular, the alignment path generation system 102 receives a first selection 202 via a user interface of a client device at a first position in a digital design document comprising text. As used herein, the term digital design document refers to a digital document comprising design components. In some cases, a digital design document includes text comprising glyphs. For instance, a digital design document comprises art object, text, photographic images, or other types of objects. As used herein, the term text refers to any written material comprising glyphs.

As used herein, the term selection refers to an action or input made by a user. In particular, a selection comprises an indication, such as a click point or touch gesture, of a location within a user interface. For example, a user selects a location by clicking on a position in a digital design document or tapping on a position on a touch enabled display device. In some implementations, the alignment path generation system 102 determines a position corresponding with a selection. For example, and as shown in FIG. 2A, the alignment path generation system 102 determines that the first selection is at a first position 218 in a digital design document. In some embodiments, the first position indicates a location along a path within a digital document. For example, the first position 218 indicates a beginning point for a path.

Figure 5:
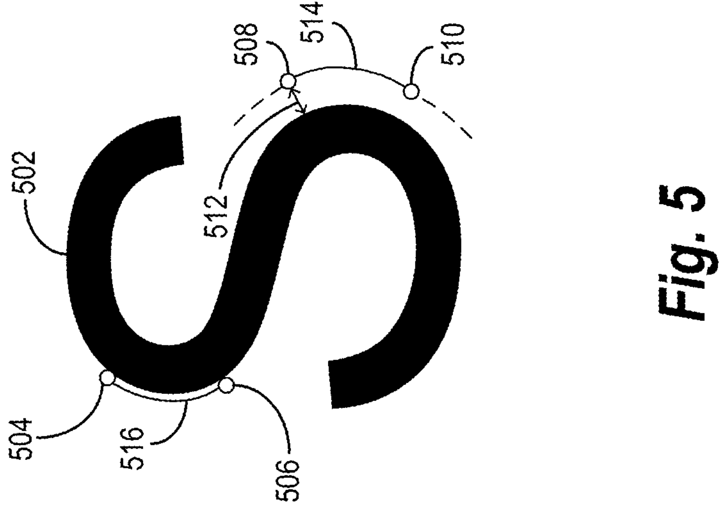
FIG. 5 illustrates generating a path between a first position and a second position in accordance with one or more implementations of the current disclosure.

The alignment path generation system 102 generates one or more of a (i) duplicate path having a geometry identical to a glyph geometry, (ii) an offset path of a glyph geometry having a slightly modified geometry at an offset from the glyph, or (iii) a design path that deviates from the geometry of a glyph. As shown in FIG. 2A, the first position 218 is offset slightly from the edge of the glyph. In some implementations, based on determining that the first position 218 is offset from the edge of the glyph, the alignment path generation system 102 generates an offset path of a glyph geometry. In other examples, based on determining that the first position 218 is within an edge of the glyph, the alignment path generation system 102 determines to generate a duplicate path. FIG. 5 and the corresponding paragraphs further detail how the alignment path generation system 102 generates both duplicate paths and offset paths in accordance with one or more implementations of the current disclosure.

Figure 3:
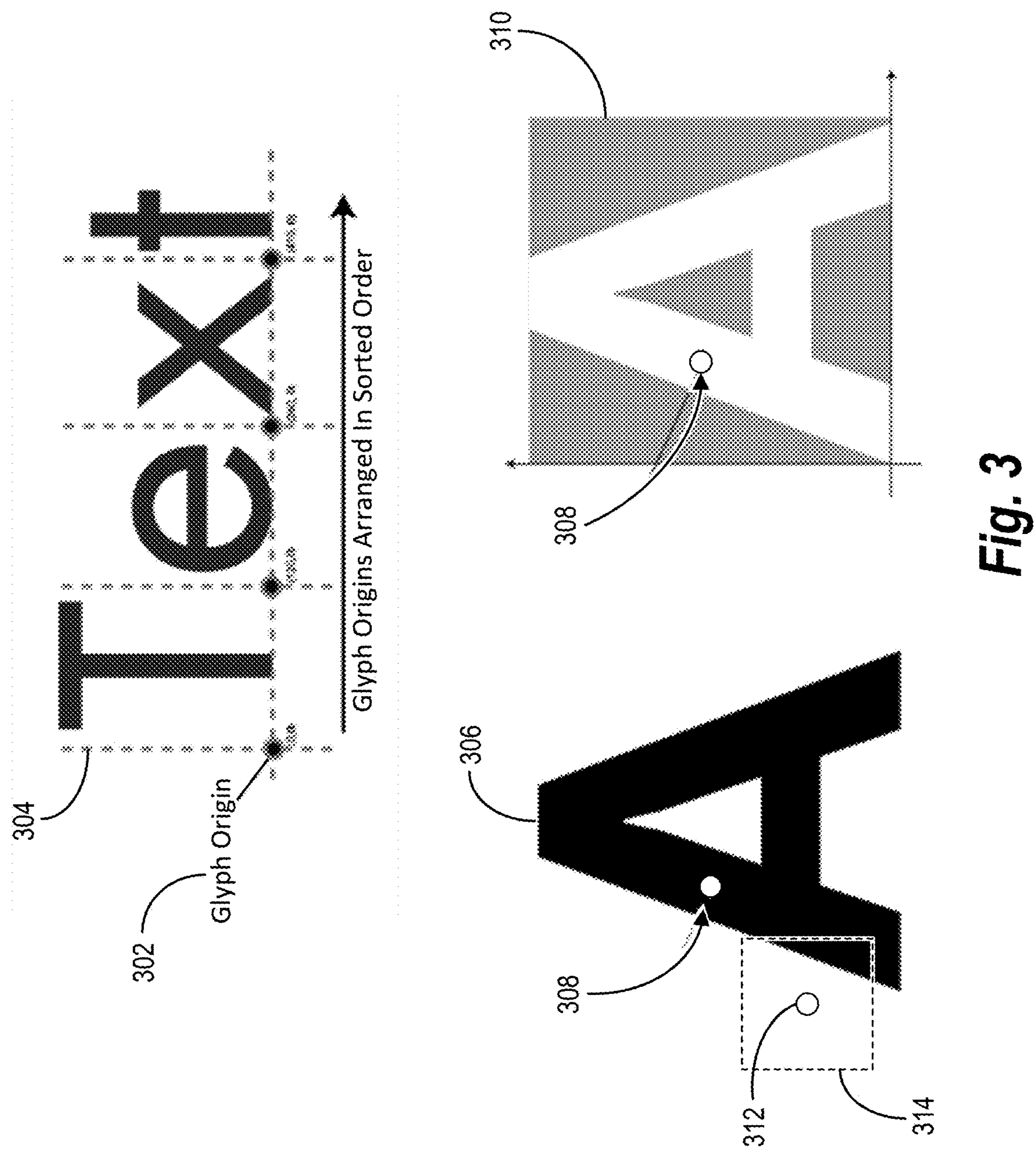
FIG. 3 illustrates identifying a glyph of a text nearest a location of a position in accordance with one or more implementations of the current disclosure.

As further shown in FIG. 2A, the alignment path generation system 102 identifies a glyph 204. In particular, the alignment path generation system 102 identifies a glyph 204 of a text nearest a location of the first position 218. As used herein, the term glyph refers to graphical representations or symbols used to depict individual characters or symbols. For example, text includes comprise glyphs such as characters, symbols, alphanumeric representations, punctuation marks, and other representations. The alignment path generation system 102 identifies a glyph 204 nearest the location of the first position 218. As shown in FIG. 2A, the first position 218 is located between a glyph 222 and a glyph 220. The alignment path generation system 102 determines that the glyph 220 is nearest the location of the first position 218. FIG. 3 and the corresponding paragraphs illustrate various methods by which the alignment path generation system 102 identifies a glyph in accordance with one or more embodiments of the present disclosure.

As illustrated in FIG. 2A, the alignment path generation system 102 determines a geometry 206 of the glyph. As used herein, the term glyph geometry (or simply "geometry") refers to a spatial arrangement and design characteristics of a glyph. For example, glyph geometry is representable using vector-based graphics such as Bezier curves, which mathematically define the paths and contours of each glyph. A glyph geometry, in one or more implementations, include lines. For example, the letter "A" comprises two diagonal lines and a horizontal line. A glyph geometry also optionally comprises dots or other visual representations/decorations.

In some implementations, the alignment path generation system 102 determines the geometry of the glyph based on a glyph outline. For example, and as illustrated in FIG. 2A, the alignment path generation system 102 extracts a glyph outline 224 for the identified glyph 220. In some examples, glyph outline data comprises a set of control points that define the Bezier curves forming the glyph's geometry.

Figure 4:
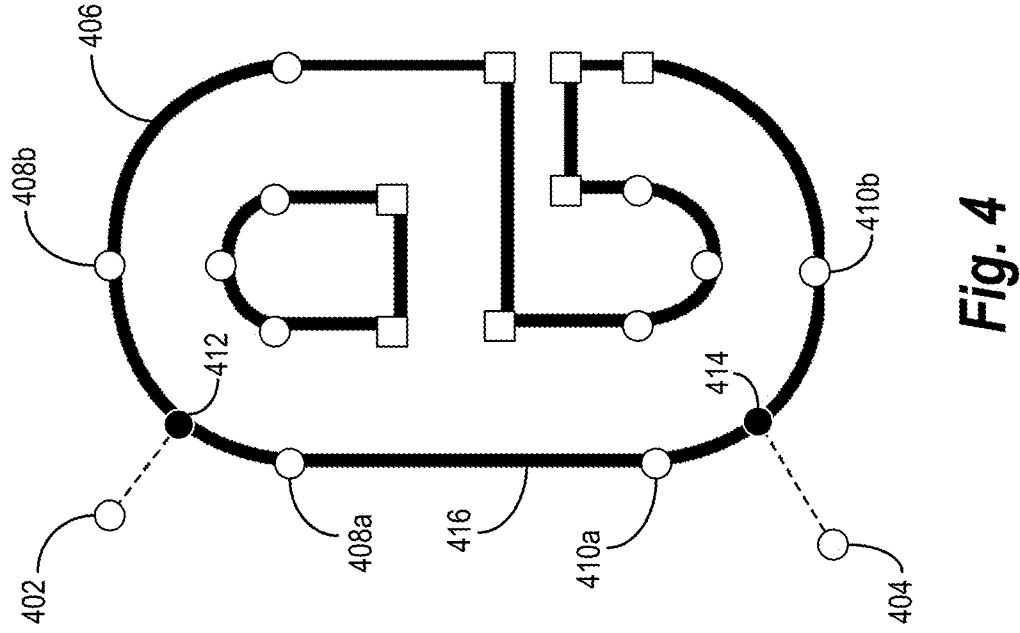
FIG. 4 illustrates determining the geometry of a glyph in accordance with one or more implementations of the current disclosure.

FIG. 2A further illustrates the alignment path generation system 102 determining a first parametric value 208. In particular, the alignment path generation system 102 determines a first parametric value of the geometry of the glyph nearest the first position. The alignment path generation system 102 utilizes the glyph outline 224 to identify a parametric value for a segment of the glyph nearest to the first position 218. For example, the glyph outline data comprises information including a start point and an end point for each curve segment in a glyph geometry. The alignment path generation system 102 identifies a parametric value for a segment of the glyph nearest to the first position 218. FIG. 4 and the corresponding paragraphs describe the digital media management system 106 determining a first parametric value in accordance with one or more embodiments of the current disclosure.

As further shown in FIG. 2A, the alignment path generation system 102 receives a second selection 210. In particular, the alignment path generation system 102 receives a second selection via the user interface of the client device at a second position in the digital design document. For example, the alignment path generation system 102 receives a second selection at a second position 226. The alignment path generation system 102 determines that the second position 226 is a point within the path.

FIG. 2B illustrates the alignment path generation system 102 determining that the second position is within a tolerance 212 of the glyph. As used herein, the term tolerance refers to an allowable range or distance within which elements will align. For example, a tolerance refers to a threshold distance from an edge of a glyph. For instance, a tolerance is set to 5 pixels within an edge of a glyph geometry. As shown in FIG. 2B, the alignment path generation system 102 determines that the second position 226 is within a tolerance 228 of the glyph 220. In some embodiments, based on determining that the second position is within a tolerance of the glyph, the alignment path generation system 102 determines to snap the path to the glyph 220 from the first position to the second position.

As illustrated in FIG. 2B, the alignment path generation system 102 determines a second parametric value 214. More particularly, the alignment path generation system 102 determines a second parametric value of the geometry of the glyph nearest to the second position. As shown, in some implementations, the alignment path generation system 102 utilizes the glyph outline 224 to determine the second parametric value. More specifically, the alignment path generation system 102 utilizes the glyph outline 224 to determine a parametric value for a segment of the glyph nearest to the second position 226. FIG. 4 and the corresponding paragraphs describe the digital media management system 106 determining a second parametric value in accordance with one or more embodiments of the current disclosure.

As shown in FIG. 2B, the alignment path generation system 102 generates a path 216. In particular, the alignment path generation system 102 generates a path 230 between the first position 218 and the second position 226. More particularly, the path follows the geometry of the glyph at a consistent offset relative to the glyph based on the first parametric value and the second parametric value. As mentioned, FIG. 5 illustrates the digital media management system 106 generating paths in accordance with one or more implementations of the current disclosure.

Figure 6A:
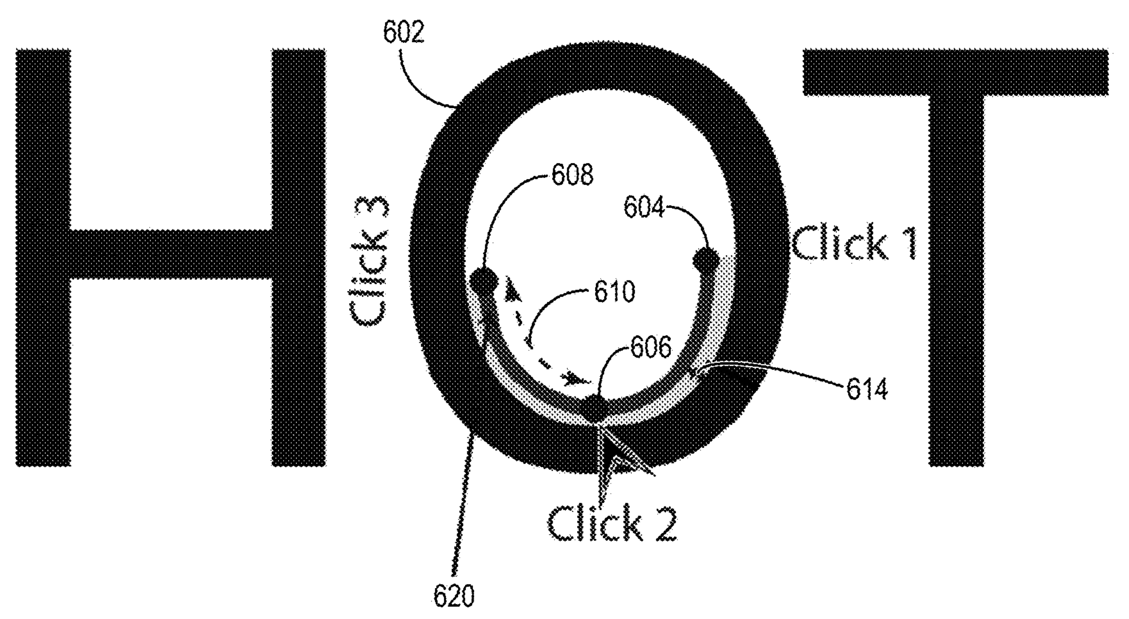
FIGS. 6A-6B illustrate generating a path that deviates from a geometry of a glyph in accordance with one or more implementations of the present disclosure.
Figure 6A:
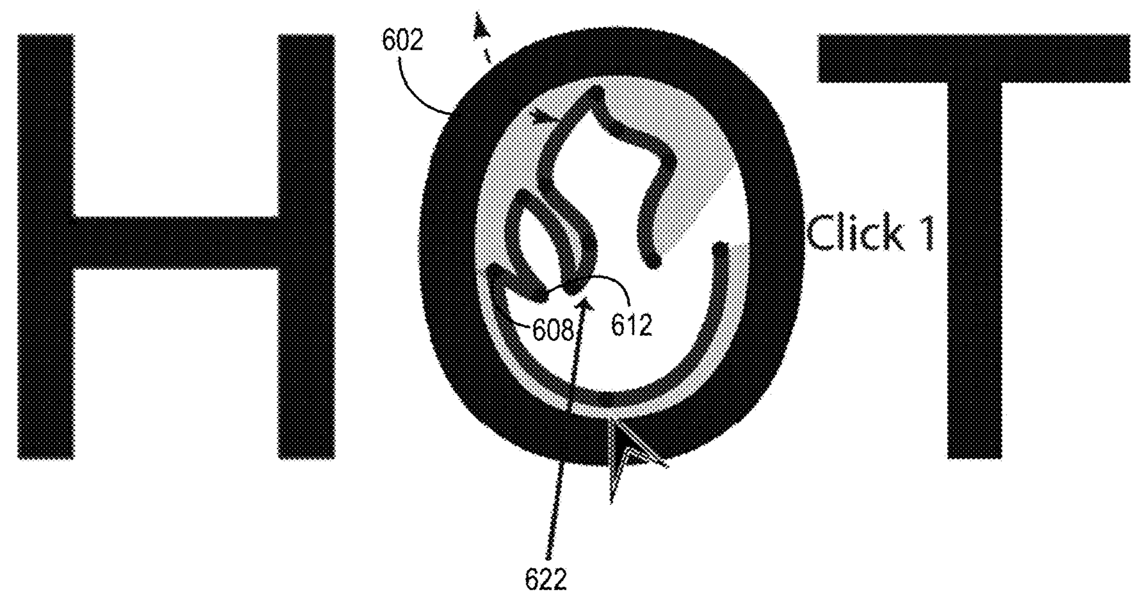
Figure 6B:
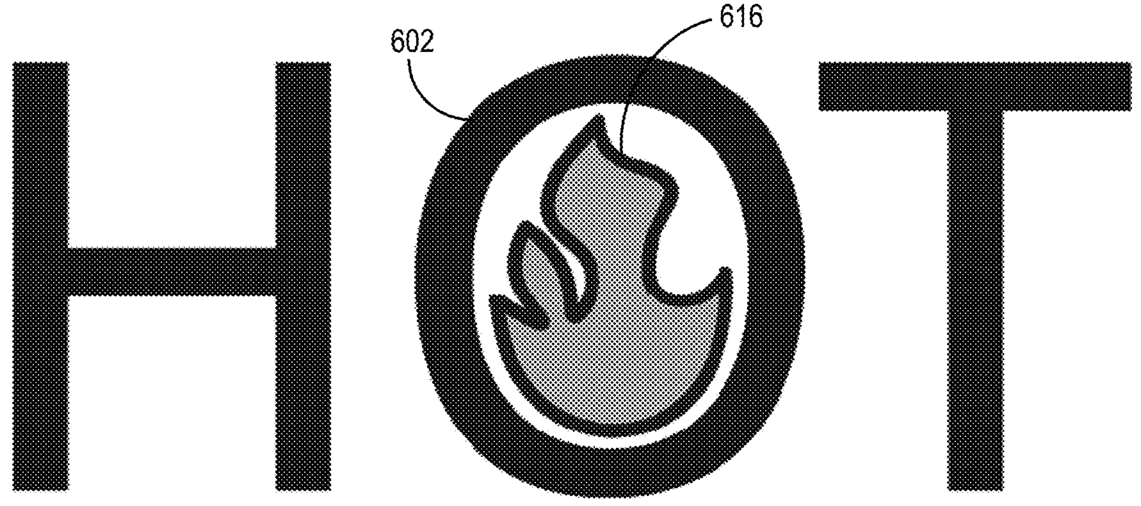

In some examples, a designer desires to generate decorative paths that do not follow the geometry of a glyph. In some embodiments, the alignment path generation system 102 generates deviated paths that deviate from the geometry of the glyph. FIGS. 6A-6B illustrate the alignment path generation system 102 generating deviated paths in accordance with one or more implementations of the present disclosure.

Figure 7:
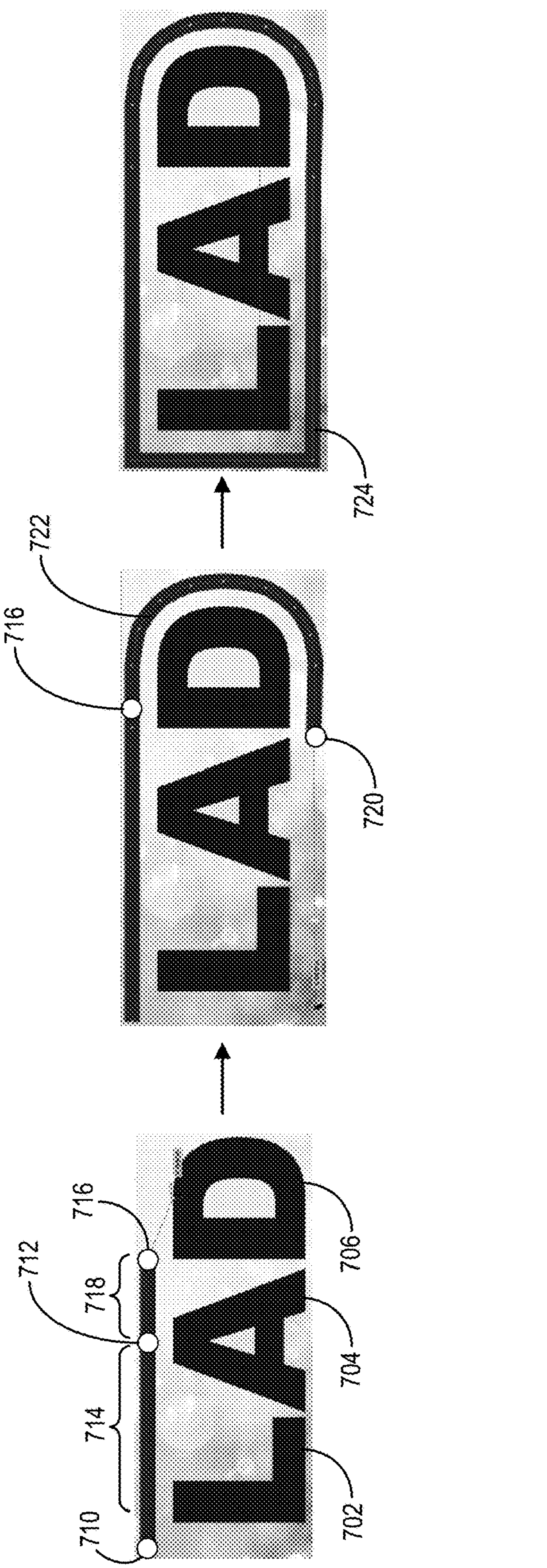
FIG. 7 illustrates generating a path that aligns with geometries of a plurality of glyphs in accordance with one or more embodiments.

Furthermore, in some implementations, the alignment path generation system 102 generates paths that align with the geometries of a plurality of glyphs. For instance, the alignment path generation system 102 generates a path that aligns with geometries of several glyphs without additional interventions from the designer. FIG. 7 and the corresponding discussion further detail the digital media management system 106 generating a path that aligns with the geometries of a plurality of glyphs in accordance with one or more implementations of the present disclosure.

As mentioned, the alignment path generation system 102 identifies a glyph of text nearest a location of a position indicating a user selection. FIG. 3 illustrates the alignment path generation system 102 identifying a glyph of text nearest a location of a position in accordance with one or more implementations of the current disclosure. In particular, FIG. 3 illustrates two methods that the alignment path generation system 102 utilizes in identifying a glyph in one or more implementations.

The alignment path generation system 102 generates paths that align with any part of a glyph while keeping text live. In particular, in one or more implementations, the alignment path generation system 102 generates paths without converting the text to vector or outline form. By keeping the text live, the alignment path generation system 102 is able to change the content, style, and other attributes of the text. However, because the alignment path generation system 102 keeps the text live, the alignment path generation system 102 identifies glyphs to which a generated path will align.

In some implementations, the alignment path generation system 102 identifies the glyph based on the first position within the glyph geometry. For example, and as illustrated in FIG. 3, the alignment path generation system 102 identifies a glyph 306 based on determining that a first position 308 is within the geometry of the glyph 306. In some implementations, the alignment path generation system 102 determines to generate a duplicate path that copies the geometry of the glyph based on determining that the first position 308 is within the geometry of the glyph 306.

Additionally, or alternatively, the alignment path generation system 102 identifies glyphs that are nearest to a position. As illustrated in FIG. 3, the alignment path generation system 102 determines that a first position 312 is not within the geometry of the glyph 306. The first position 312 is offset relative to the glyph 306. To enable generation of an offset path that maintains a consistent offset relative to the glyph 306, the alignment path generation system 102 assumes a position margin 314. The position margin defines an allowable distance from a position within which a glyph is identified. For example, the position margin 314 comprises a square, rectangle, or circle of width (or radius) A that is centered at the first position 312. The alignment path generation system 102 identifies a glyph that intersects with the position margin 314. As shown in FIG. 3, the alignment path generation system 102 determines that the glyph 306 intersects with the position margin 314. In some implementations, the alignment path generation system 102 determines to generate an offset path that aligns with the glyph based on determining that the glyph 306 intersects the position margin 314.

The alignment path generation system 102 utilizes different methods to identify a glyph in one or more embodiments. In some implementations, the alignment path generation system 102 extracts text metadata to identify the glyph. Text metadata includes additional information or data associated with text. For example, text metadata includes a glyph origin 302. The glyph origin 302 is a point within a glyph used as a reference for positioning and aligning the glyph in relation to other glyphs within text. The glyph origin 302 is calculated using the virtual space where the glyph is positioned within a bounding box that encloses the glyph. FIG. 3 illustrates a bounding box 304 defined by dotted lines. In some implementations, the alignment path generation system 102 identifies a glyph based on detecting that the position is within a bounding box for a glyph. For instance, the alignment path generation system 102 identifies the glyph "T" based on identifying that the position is within the bounding box 304 corresponding with the glyph "T." Additionally, or alternatively, the alignment path generation system 102 identifies a glyph based on detecting that the position margin 314 intersects with the bounding box 304. In some examples, the alignment path generation system 102 determines that the position margin 314 intersects with the bounding boxes of more than one glyph. In such instances, the alignment path generation system 102 identifies a glyph with a bounding box occupying a greater area of the position margin 314. In some implementations, the alignment path generation system 102 identifies a glyph based on determining an origin for the glyph and determining that the origin for the glyph is nearest to the location of the first position.

Additionally, or alternatively, in some implementations, the alignment path generation system 102 utilizes a glyph mask to identify a glyph. In particular, the alignment path generation system 102 extracts a glyph mask 310 from a font engine. Generally, a font engine renders fonts and displays text on a graphical user interface or other output device. In many cases, font engines prepare glyph masks based on information inside the font. In one or more implementations, the alignment path generation system 102 communicates with a font engine to extract the glyph mask 310 (e.g., a glyph bitmap mask). In some embodiments, the alignment path generation system 102 generates the glyph mask 310 based on hinting information inside the font. Generally, the alignment path generation system 102 identifies a glyph based on determining that a position is within the glyph mask 310.

For example, and as illustrated in FIG. 3, the alignment path generation system 102 determines the first position 308. The first position 308 comprises a global position or a position represented in global coordinates referring to a screen's coordinate system. For instance, the global position of the first position 308 is expressed as (300, 400). The alignment path generation system 102 transforms the global position to a local position with respect to the glyph mask 310. In some examples, the alignment path generation system 102 utilizes bi-linear interpolation to estimate the local position within the glyph mask 310 if the transformed global position is not an integer. As shown in FIG. 3, the alignment path generation system 102 determines that the local coordinates of the first position 308 relative to the glyph mask 310 equals (25, 26).

Based on identifying the glyph, the alignment path generation system 102 determines the geometry of the glyph. FIG. 4 illustrates the alignment path generation system 102 determining the geometry of the glyph in accordance with one or more implementations of the present disclosure. As mentioned, the alignment path generation system 102 determines a geometry of a glyph and determines parametric values of the geometry of the glyph.

As mentioned, the alignment path generation system 102 fetches a glyph outline of the identified glyph. In particular, the alignment path generation system 102 extracts a glyph outline 406 of the identified glyph. As used herein, the term glyph outline refers to a visual representation of a glyph. For example, a glyph outline is defined using mathematical curves, such as Bezier curves or quadratic curves. In additional embodiments, the glyph outline includes another type of path such as, but not limited to, Hermite curves, B-splines, non-uniform rational basis splines, Kappa-curves, or Catmull-Rom splines. In any event, the glyph outline comprises curve and other geometry data.

As shown in FIG. 4, the glyph outline 406 comprises control points (e.g., control points 408*a*-408*b* and control points 410*a*-410*b*). Generally, control points comprise points that define the shape and curvature of Bezier curves or other geometries used to create a glyph's visual appearance. In some examples, control points indicate the start and end positions of a curve segment. For example, and as illustrated in FIG. 4, the control point 408*a* and the control point 408*b* indicate the ends of a curve segment. In a glyph outline, multiple curve segments are combined to form the complete shape of the glyph. Each of the curve segments has its own set of parametric values that contribute to the overall outline of the glyph.

As mentioned previously, the alignment path generation system 102 determines a first parametric value of the geometry of the glyph nearest to the first position. As shown in FIG. 4, the alignment path generation system 102 determines a first position 402. The alignment path generation system 102 identifies a curve segment 412 that is nearest to the first position 402. In some embodiments, the curve segment 412 comprises a Bezier curve of the glyph outline 406 that is nearest to the first position 402. Based on identifying the curve segment 412 nearest to the first position 402, the alignment path generation system 102 extracts a parametric value for the curve segment 412. For example, the alignment path generation system 102 determines a first parametric value (1) of the curve segment 412 nearest to the first position 402. In some implementations, the first parametric value is expressed as $t_{prev}$.

In one or more implementations, the alignment path generation system 102 determines a second parametric value (1) of the geometry of the glyph nearest to a second position. FIG. 4 illustrates a second position 404 relative to the glyph outline 406. The alignment path generation system 102 determines a curve segment 414 that is nearest to the second position 404. In some embodiments, the curve segment 414 comprises a Bezier curve of the glyph outline 406.

Furthermore, in some implementations, the alignment path generation system 102 determines one or more intermediate parametric values of the geometry of the glyph between the first position and the second position. Generally, the alignment path generation system 102 generates a path between a first position and a second position that aligns with a glyph. In addition to determining a first parametric value and a second parametric value, the alignment path generation system 102 also determines one or more intermediate parametric values of the geometry of the glyph between the first position and the second position. The alignment path generation system 102 utilizes the one or more intermediate parametric values to generate a path that aligns with the entire glyph geometry between successive selections.

For example, FIG. 4 illustrates an intermediate segment 416 between the first position 402 and the second position 404. The intermediate segment 416 is between the control point 408*a* and the control point 410*a*. The alignment path generation system 102 determines an intermediate parametric value of the geometry of the glyph between the first position 402 and the second position 404. In some implementations, the alignment path generation system 102 determines a plurality of intermediate parametric values for the geometry of the glyph. For example, the geometry of the glyph has one or more intermediate curve segments between the first position 402 and the second position 404. By automatically determining the one or more intermediate curve segments, the alignment path generation system 102 efficiently generates paths that align with a glyph geometry with minimal user input.

As mentioned, the alignment path generation system 102 generates a path between the first position and the second position based on the first parametric value and the second parametric value. FIG. 5 illustrates the alignment path generation system 102 generating a path between the first position and the second position in accordance with one or more implementations of the present disclosure. FIG. 5 illustrates the alignment path generation system 102 generating a duplicate path 516 and an offset path 514.

In one or more implementations, the alignment path generation system 102 generates a duplicate path having a path geometry that is identical to the geometry of the glyph. For example, and as illustrated in FIG. 5, the alignment path generation system 102 generates the duplicate path 516 along an edge of the glyph 502. The alignment path generation system 102 generates the duplicate path 516 between a first position 504 and a second position 506. The duplicate path 516 retains the same curvature, direction, and length of the curve segments of the glyph geometry between the first position 504 and the second position 506.

The alignment path generation system 102 generates the duplicate path 516 based on the geometry of the glyph 502. In particular, the alignment path generation system 102 generates the duplicate path 516 having a path geometry that is identical to the glyph geometry. More specifically, the parametric values of the duplicate path 516 equal the first parametric value corresponding with the first position 504 and the second parametric value corresponding with the second position 506. Additionally, the alignment path generation system 102 copies intermediate parametric values corresponding with the geometry of the glyph 502 between the first position 504 and the second position 506.

In some embodiments, the alignment path generation system 102 determines to generate the duplicate path 516 based on user input. In some embodiments, the alignment path generation system 102 determines to generate the duplicate path 516 based on determining that the first position 504 and/or the second position 506 are within a threshold distance of an edge of the glyph 502. In some examples, the alignment path generation system 102 determines to generate the duplicate path 516 based on an indication to create an exact copy of the geometry of the glyph 502. For instance, in some implementations, the alignment path generation system 102 determines to generate the duplicate path 516 based on receiving a user selection of a duplicate path element. Based on selection of the duplicate path element, the alignment path generation system 102 generates the duplicate path that copies the Bezier geometry of the glyph 502.

As illustrated in FIG. 5, the alignment path generation system 102 generates the offset path 514. Generally, the offset path 514 is a path having a path geometry that is similar but not identical to the geometry of the glyph 502. In particular, the offset path 514 is parallel to the geometry of the glyph 502 but located at a consistent offset distance from the glyph's curve. As shown, the alignment path generation system 102 generates the offset path 514 between a first position 508 and a second position 510. The offset path 514 follows the geometry of the glyph 502 at a consistent offset 512 relative to the glyph 502. For example, the entire length of the offset path 514 from the first position 508 to the second position 510 maintains the offset 512 relative to the glyph 502.

As part of generating the offset path 514, the alignment path generation system 102 calculates a path geometry based on the glyph geometry and the offset 512. The alignment path generation system 102 determines offset parametric values for the offset path 514 based on the glyph geometry and the offset 512. For example, the alignment path generation system 102 determines offset parametric values that result in the offset path 514 maintaining the same overall shape as the glyph 502 but being shifted inward or outward depending on a direction of the offset 512. In one example, the alignment path generation system 102 determines a first offset path parametric value based on the first parametric value and a second offset path parametric value based on the second parametric value. Additionally, the alignment path generation system 102 determines one or more intermediate offset path parametric values based on one or more intermediate parametric values between the first position 508 and the second position 510. The alignment path generation system 102 generates the offset path 514 having the determined offset path parametric values for the path geometry including the first offset path parametric value, the second offset path parametric value, and the one or more intermediate offset path parametric values.

As shown in FIG. 5, the alignment path generation system 102 determines the offset 512. In some embodiments, the alignment path generation system 102 determines the offset 512 based on the first position 508 and/or the second position 510. For instance, the alignment path generation system 102 determines that the offset 512 equals a distance between the first position 508 and an edge of the glyph 502 or a distance between the second position 510 and the glyph 502. In some implementations, where the distance between the first position 508 and the glyph 502 is different than the distance between the second position 510 and the glyph, the alignment path generation system 102 determines that the offset 512 equals a combination of the distances. For instance, the alignment path generation system 102 sets the offset 512 to equal an average of the distances between the (i) first position 508 and the glyph 502 and the (ii) second position 510 and the glyph 502.

In some implementations, the alignment path generation system 102 predetermines the offset 512. For example, the alignment path generation system 102 automatically predetermines the offset 512 to be a certain number of pixels based on a font size of the glyph 502 based on a predefined setting. In another example, the alignment path generation system 102 predetermines the offset 512 based on user input. More specifically, the alignment path generation system 102 determines the offset 512 based on user interaction with an offset element. In one example, the alignment path generation system 102 receives a user selection at a position on the glyph 502. The alignment path generation system 102 presents, via a graphical user interface, an offset element that provides options to set an offset value (8). Instead of designating a location of the user selection as the first position, the alignment path generation system 102 determines that the first position is at the offset value (8) from the glyph 502. The alignment path generation system 102 places subsequent positions at the same offset value from the glyph 502.

As described previously, the alignment path generation system 102 also generates a path that deviates from a geometry of the glyph based on user input. In some implementations, the alignment path generation system 102 flexibly deviates a path from the geometry of the glyph to create decorations. FIGS. 6A-6B illustrate the alignment path generation system 102 generating a path that deviates from a geometry of a glyph in accordance with one or more implementations of a present disclosure.

As illustrated in FIG. 6A, the alignment path generation system 102 generated a path 620 that aligns with the inside geometry of a glyph 602. More specifically, the alignment path generation system 102 generated the path 620 between a first position 604, a second position 606, and a third position 608. The path 620 is at an offset 614 relative to the inside edge of the glyph 602.

In one or more embodiments, the alignment path generation system 102 determines to generate an offset path based on a second position falling within a tolerance of a glyph. Generally, the alignment path generation system 102 determines whether to generate a path that aligns with or deviates from a geometry of the glyph based on determining whether a position falls within the tolerance of the glyph. As mentioned previously, a tolerance refers to an allowable range or distance within which elements will align. The alignment path generation system 102 gives priority to aligning a path with an existing glyph curve by increasing the tolerance 610. For instance, based on determining that a second position is within a tolerance of the glyph 602, the alignment path generation system 102 determines to generate a path from a first position to the second position that aligns with a geometry of the glyph 602. For example, FIG. 6A illustrates that the third position 608 is within a tolerance 610 of the glyph 602. Accordingly, the alignment path generation system 102 generates a path between the second position 606 and the third position 608 that is aligned with the geometry of the glyph 602.

Based on determining a position outside the tolerance 610 of the glyph 602, the alignment path generation system 102 generates a deviated path. For example, the alignment path generation system 102 determines that a fourth selection at a fourth position 612 is outside the tolerance 610 of the glyph 602. As shown, instead of generating a path between the third position 608 and the fourth position 612 that aligns with a geometry of the glyph 602, the alignment path generation system 102 generates a deviated path from the third position 608 to the fourth position 612. As shown by the subsequent positions, the alignment path generation system 102 generate additional deviated paths between additional subsequent positions outside the tolerance 610 of the glyph 602. As shown in FIG. 6A, the alignment path generation system 102 generates a deviated path 622 by connecting additional subsequent positions.

FIG. 6B illustrates a glyph decoration 616 within the glyph 602. The glyph decoration 616 comprises an offset path and a deviated path. In some implementations, and as shown in FIG. 6B, the alignment path generation system 102 closes the path or joins ends of the path. More specifically, the alignment path generation system 102 connects the offset path and the deviated path to form a closed path.

As mentioned, the alignment path generation system 102 further generates a path that aligns with geometries of a plurality of glyphs within text based on user input. FIG. 7 illustrates the alignment path generation system 102 generating a path that aligns with geometries of a plurality of glyphs in accordance with one or more implementations of the present disclosure.

The alignment path generation system 102 provides a fluent way of generating paths with the aid of auto completion of partial paths. More specifically, the alignment path generation system 102 maintains intact curved paths that align with the geometries of several glyphs. More specifically, the alignment path generation system 102 takes existing partial paths and automatically completes missing segments to form a smooth and continuous path.

For example, FIG. 7 illustrates a first glyph 702, a second glyph 704, and a third glyph 706. As shown, the alignment path generation system 102 receives a first selection at a first position 710, a second selection at a second position 712, and a third selection at a third location 716. As shown, the alignment path generation system 102 determines that the first glyph 702 is nearest the location of the first position 710. Accordingly, the alignment path generation system 102 determines a parametric value of the geometry of the first glyph 702 nearest to the first position 710. The alignment path generation system 102 receives the second selection at the second position 712. The alignment path generation system 102 further determines identifies the second glyph 704 as being nearest the location of the second position 712. Thus, the alignment path generation system 102 determines a parametric value of the geometry of the second glyph 704 nearest to the second position 712. The alignment path generation system 102 generates a path 714 between the first position 710 and the second position 712. The path 714 is parallel to the geometries of both the first glyph 702 and the second glyph 704.

The alignment path generation system 102 does not require additional user intervention to autocomplete partial trajectories of the paths. As shown in FIG. 7, the alignment path generation system 102 autocompletes partial trajectories of the path between the first position 710 and the second position 712. For example, the alignment path generation system 102 replicates the path geometry for the gap between the first position 710 and the second position 712. The alignment path generation system 102 generates the second position 712 having a path geometry that aligns with both geometries from the first glyph 702 and the second glyph 704. In some embodiments, the alignment path generation system 102 autocompletes partial trajectories based on intermediate parametric values of the geometries of the glyph first glyph 702 and/or the second glyph 704. For example, in some implementations, based on determining that the path intersects a glyph outline, the alignment path generation system 102 determines to utilize a path geometry that aligns with the intersecting glyph.

As shown in FIG. 7, the alignment path generation system 102 determines that the third glyph 706 is nearest to the third location 716. The alignment path generation system 102 generates a path 718 connecting the second position 712 and the third location 716 based on the geometries of the second glyph 704 and the third glyph 706. For example, the alignment path generation system 102 extracts a parametric value of the geometry of the second glyph 704 nearest the second position 712 and also extracts a parametric value of the geometry of the third glyph 706 nearest the third location 716.

As further illustrated in FIG. 7, the alignment path generation system 102 also generates a path 722 that aligns with a geometry of a single glyph. For example, and as described above with respect to FIG. 5, the alignment path generation system 102 generates the path 722 between the third location

716 and a fourth location 720 that follows the geometry of the third glyph 706 at a consistent offset relative to the fourth location 720. As further shown, the alignment path generation system 102 auto generates a path geometry that accurately parallels the glyph geometry of the third glyph 706 without additional user selections. More specifically, the alignment path generation system 102 generates the path 722 based on two user selections-one at the third location 716 and another at the fourth location 720.

As further shown in FIG. 7, the alignment path generation system 102 joins the ends of the component paths to create a closed path 724. As illustrated, the alignment path generation system 102 accurately generates the closed path 724 that aligns with geometries of the first glyph 702, the second glyph 704, and the third glyph 706 using a limited number of user selections. Thus, the alignment path generation system 102 reduces the amount of user interaction required to accurately generate an alignment path—even one that aligns with a plurality of glyphs.

Figure 8:
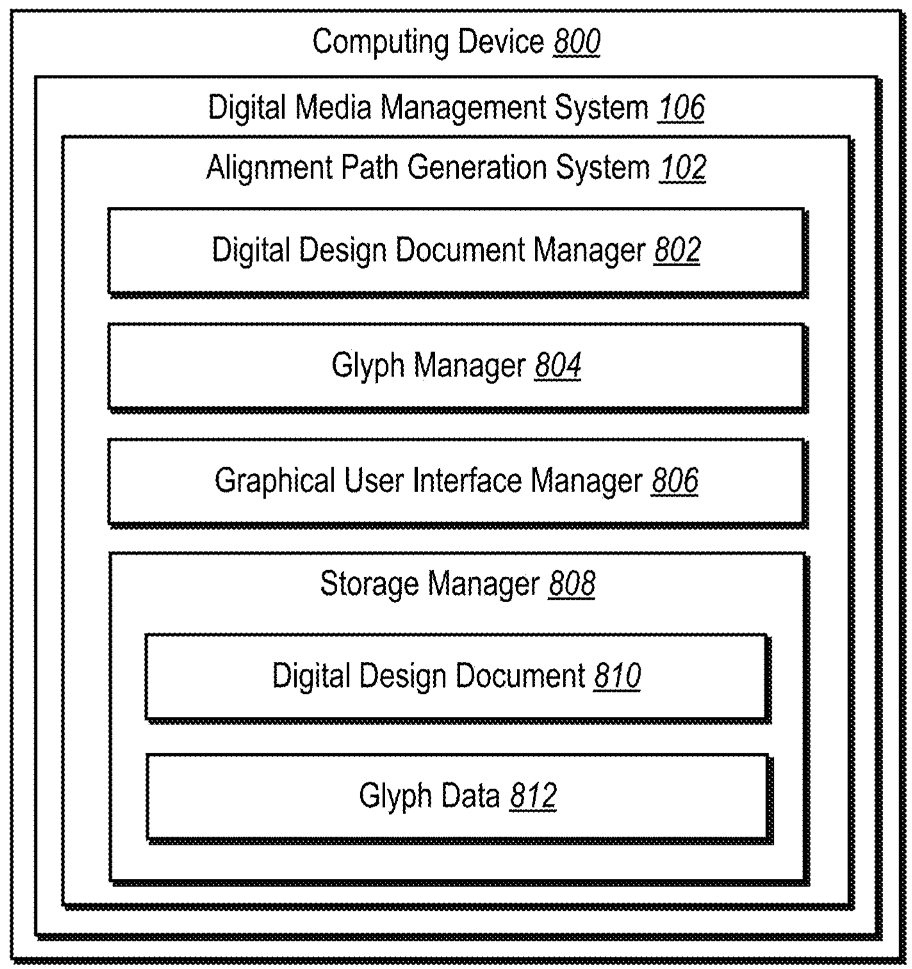
FIG. 8 illustrates an example schematic diagram of the alignment path generation system in accordance with one or more embodiments.

FIG. 8 provides additional detail regarding components and capabilities of the alignment path generation system 102. Specifically, FIG. 8 illustrates an example schematic diagram of the alignment path generation system 102 on an example computing device 800 (e.g., one or more of the client device 108 and/or the server(s) 104). In some embodiments, the computing device 800 refers to a distributed computing system where different managers are located on different devices, as described above. As shown in FIG. 8, the alignment path generation system 102 includes a digital design document manager 802, a glyph manager 804, a graphical user interface manager 806, and a storage manager 808.

As just mentioned, the alignment path generation system 102 includes the digital design document manager 802. In particular, the digital design document manager 802 receives, manages, maintains, and/or provides digital design documents. For example, as described above, the digital design document manager 802 receives and/or generates a digital design document comprising text.

As shown in FIG. 8, the alignment path generation system 102 also includes the glyph manager 804. The glyph manager 804 obtains, receives, generates, manages, and/or identifies glyphs within a digital design object. For example, the glyph manager 804 identifies glyphs, edits glyphs, and accesses glyph data. In some implementations, the glyph manager 804 accesses glyph metadata, glyph outline data, glyph parametric data, and other glyph data.

Moreover, the alignment path generation system 102 includes the graphical user interface manager 806. The graphical user interface manager 806 generates and/or manages a graphical user interface. For example, the alignment path generation system 102 presents a digital design document via a user interface of a client device. The graphical user interface manager 806 also receives and manages user interactions with the user interface. For example, the graphical user interface manager 806 receives user selections and presents generated paths via the graphical user interface. The graphical user interface manager 806 also presents various graphical user interface elements used as part of generating paths.

Moreover, the alignment path generation system 102 also includes the storage manager 808. The storage manager 808 operates in conjunction with or includes one or more memory devices such as a database that stores various data such as a digital design document 810, glyph data 812, path data, and other data.

In one or more embodiments, each of the components of the alignment path generation system 102 are in communication with one another using any suitable communication technologies. Additionally, the components of the alignment path generation system 102 is in communication with one or more other devices including one or more client devices described above. It will be recognized that although the components of the alignment path generation system 102 are shown to be separate in FIG. 8, any of the subcomponents may be combined into fewer components, such as into a single component, or divided into more components as may serve a particular implementation. Furthermore, although the components of FIG. 8 are described in connection with the alignment path generation system 102, at least some of the components for performing operations in conjunction with the alignment path generation system 102 described herein may be implemented on other devices within the environment.

The components of the alignment path generation system 102, in one or more implementations, includes software, hardware, or both. For example, the components of the alignment path generation system 102 include one or more instructions stored on a computer-readable storage medium and executable by processors of one or more computing devices (e.g., the computing device 800). When executed by the one or more processors, the computer-executable instructions of the alignment path generation system 102 cause the computing device 800 to perform the methods described herein. Alternatively, the components of the alignment path generation system 102 comprises hardware, such as a special purpose processing device to perform a certain function or group of functions. Additionally, or alternatively, the components of the alignment path generation system 102 includes a combination of computer-executable instructions and hardware.

Furthermore, the components of the alignment path generation system 102 performing the functions described herein may, for example, be implemented as part of a stand-alone application, as a module of an application, as a plug-in for applications including content management applications, as a library function or functions that may be called by other applications, and/or as a cloud-computing model. Thus, the components of the alignment path generation system 102 may be implemented as part of a stand-alone application on a personal computing device or a mobile device. Alternatively, or additionally, the components of the alignment path generation system 102 may be implemented in any application that allows creation and delivery of marketing content to users, including, but not limited to, applications in ADOBE ILLUSTRATOR, ADOBE FONTS, and/or ADOBE CAPTURE. The foregoing are either registered trademarks or trademarks of Adobe Inc. in the United States and/or other countries.

FIGS. 1-8 and the corresponding text provide a number of different systems, methods, and non-transitory computer readable media for generating a modified digital image from a base digital image and edit text a diffusion prior. In addition to the foregoing, embodiments are describable in terms of flowcharts comprising acts for accomplishing a particular result. For example, FIG. 9 illustrates a flowchart of example sequences or series of acts in accordance with one or more embodiments.

Figure 9:
FIG. 9 illustrates a flowchart of a series of acts for generating a path between a first position and a second position in accordance with one or more implementations of the present disclosure.
Figure 9:
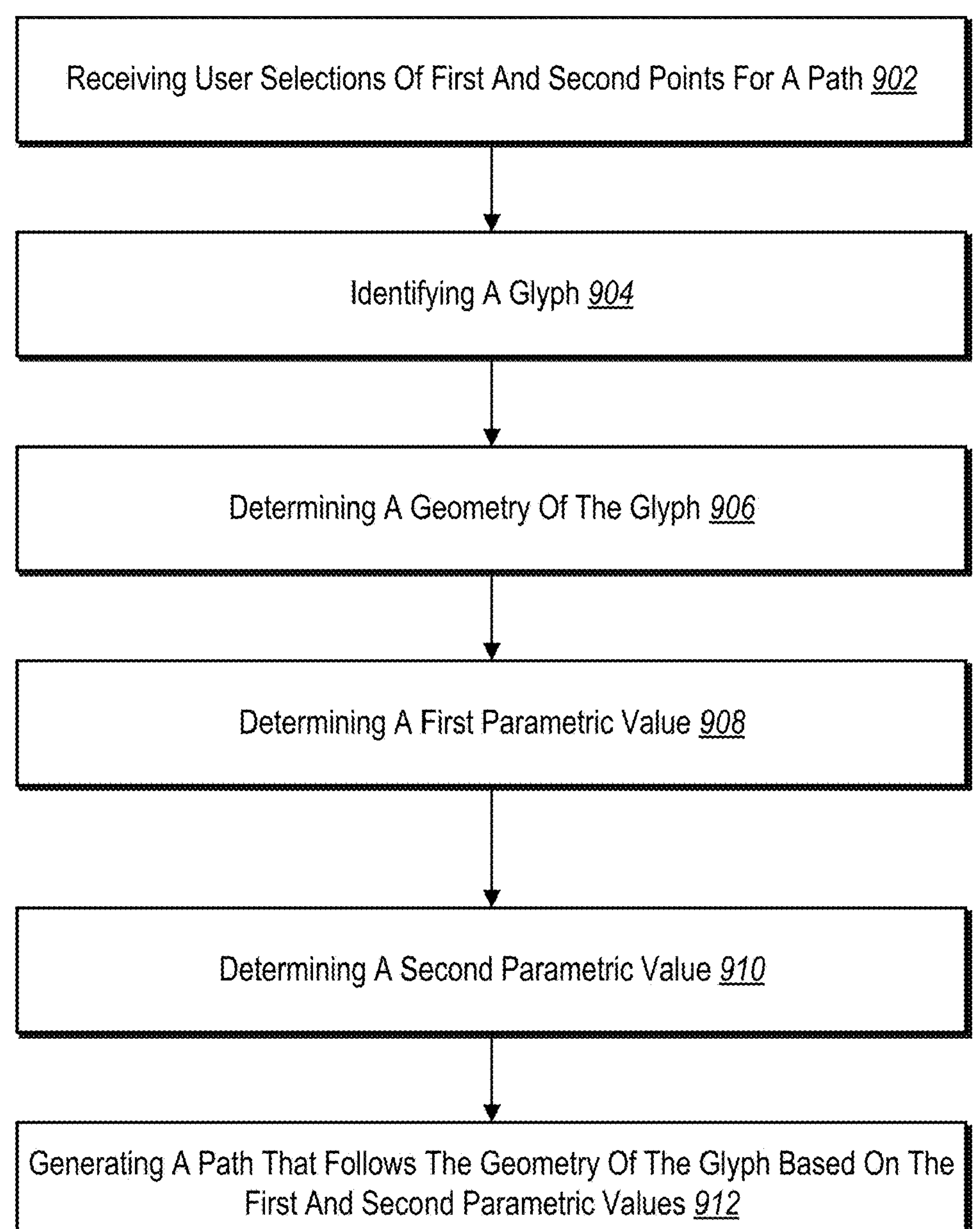

While FIG. 9 illustrates acts according to particular embodiments, alternative embodiments may omit, add to, reorder, and/or modify any of the acts shown in FIG. 9. In one or more implementation, the acts of FIG. 9 are performed as part of a method (e.g., a computer-implemented method). Alternatively, a non-transitory computer readable medium comprises instructions, that when executed by one or more processors, cause the one or more processors to operations comprising the acts of FIG. 9. In still further embodiments, a system performs the acts of FIG. 9. Additionally, the acts described herein may be repeated or performed in parallel with one another or in parallel with different instances of the same or other similar acts.

FIG. 9 illustrates an example series of acts 900 for generating and providing an updated digital design document in accordance with one or more embodiments. For example, the series of acts 900 includes acts 902-912 of receiving user selections of first and second points for a path, identifying a glyph, determining a geometry of the glyph, determining a first parametric value, determining a second parametric value, and generating a path that follows the geometry of the glyph based on the first and second parametric values. To illustrate, in some implementations, act 902 comprises receiving, via a user interface of a client device, user selections of first and second points for a path. The first point being at a first position in a digital design document comprising text and the second point being at a second position in the digital design document. Act 904 comprises identifying a glyph of the text nearest a location of the first position. Act 906 comprises determining a geometry of the glyph. Act 908 comprises determining a first parametric value of the geometry of the glyph nearest to the first position. Act 910 comprises determining a second parametric value of the geometry of the glyph nearest to the second position. Act 912 comprises generating the path between the first position and the second position that follows the geometry of the glyph at a consistent offset relative to the glyph by utilizing the first parametric value and the second parametric value to generate path geometry that follows the geometry of the glyph.

In one or more implementations, the series of acts 900 includes identifying the glyph of the text by: determining a bounding box for the glyph based on metadata for the glyph; and determining that the first position intersects with the bounding box for the glyph.

In some embodiments, the series of acts 900 includes identifying the glyph of the text by: accessing a glyph mask for the glyph based on metadata for the glyph; and determining that the first position is within the glyph mask. In some embodiments, the series of acts 900 includes editing the text, wherein the text comprises live text.

In some embodiments, the series of acts 900 comprises determining whether the second position is within a tolerance of the glyph. In such implementations, acts 910 and 912 of determining a second parametric value of the geometry of the glyph nearest to the second position and generating the path between the first position and the second position that follows the geometry of the glyph at a consistent offset relative to the glyph by utilizing the first parametric value and the second parametric value to generate path geometry that follows the geometry of the glyph are performed in response to determining that the second position is within the tolerance of the glyph.

In some embodiments, the series of acts 900 includes receiving a third selection via the user interface at a third position in the digital design document; identifying a second glyph nearest a location of the third position; determining a second geometry of the second glyph; determining a third parametric value of the second geometry of the second glyph nearest to the third position; and generating a second path between the second position and the third position that follows the geometry of the glyph and the second geometry of the second glyph based on the second parametric value and the third parametric value.

In some embodiments, the series of acts 900 includes determining, based on receiving a third selection via the user interface, a third position in the digital design document; determining that the third position is not within the tolerance of the glyph; and generating a deviated path between the second position and the third position that deviates from the geometry of the glyph. In some embodiments, the series of acts 900 includes determining the geometry of the glyph by extracting a glyph outline corresponding to the glyph.

In some embodiments, the series of acts 900 includes generating the path between the first position and the second position by: determining one or more intermediate parametric values of the geometry of the glyph between the first position and the second position; and generating the path based on the geometry of the glyph based on the one or more intermediate parametric values.

In some embodiments, the series of acts 900 includes generating the path between the first position and the second position by: generating a path geometry based on an offset and the geometry of the glyph; and generating the path having the path geometry.

Additionally, or alternatively, the series of acts 900 further comprises receiving a third selection via the user interface of the client device at a third position in the digital design document. The series of acts 900 comprises determining that the third position is not within the tolerance of the glyph. The series of act 900 includes generating a second path from the second position to the third position that deviates from the geometry of the glyph. In some implementations, the series of acts 900 further comprises determining the tolerance of the glyph based on a distance between the first position and the glyph.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 10:
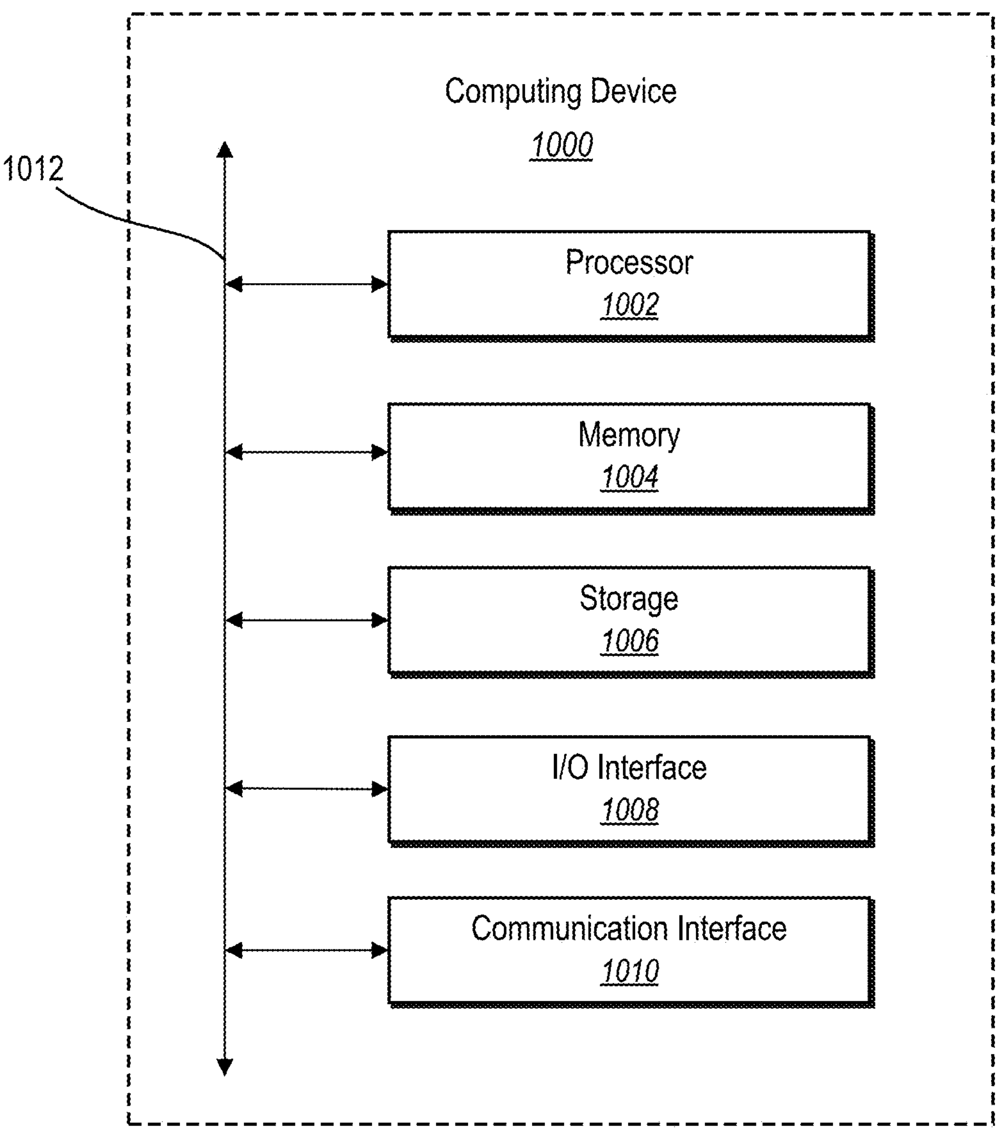
FIG. 10 illustrates a block diagram of an example computing device in accordance with one or more embodiments.

FIG. 10 illustrates, in block diagram form, an example computing device 1000 (e.g., the computing device 1100, the client device 108, and/or the server(s) 104) that may be configured to perform one or more of the processes described above. One will appreciate that the alignment path generation system 102 can comprise implementations of the computing device 1000. As shown by FIG. 10, the computing device can comprise a processor 1002, memory 1004, a storage device 1006, an I/O interface 1008, and a communication interface 1010. Furthermore, the computing device 1000 can include an input device such as a touchscreen, mouse, keyboard, etc. In certain embodiments, the computing device 1000 can include fewer or more components than those shown in FIG. 10. Components of computing device 1000 shown in FIG. 10 will now be described in additional detail.

In particular embodiments, processor(s) 1002 includes hardware for executing instructions, such as those making up a computer program. As an example, and not by way of limitation, to execute instructions, processor(s) 1002 may retrieve (or fetch) the instructions from an internal register, an internal cache, memory 1004, or a storage device 1006 and decode and execute them.

The computing device 1000 includes memory 1004, which is coupled to the processor(s) 1002. The memory 1004 may be used for storing data, metadata, and programs for execution by the processor(s). The memory 1004 may include one or more of volatile and non-volatile memories, such as Random-Access Memory ("RAM"), Read Only Memory ("ROM"), a solid-state disk ("SSD"), Flash, Phase Change Memory ("PCM"), or other types of data storage. The memory 1004 may be internal or distributed memory.

The computing device 1000 includes a storage device 1006 includes storage for storing data or instructions. As an example, and not by way of limitation, storage device 1006 can comprise a non-transitory storage medium described above. The storage device 1006 may include a hard disk drive (HDD), flash memory, a Universal Serial Bus (USB) drive or a combination of these or other storage devices.

The computing device 1000 also includes one or more input or output ("I/O") devices/interfaces 1008, which are provided to allow a user to provide input to (such as user strokes), receive output from, and otherwise transfer data to and from the computing device 1000. These I/O devices/interfaces 1008 may include a mouse, keypad or a keyboard, a touch screen, camera, optical scanner, network interface, modem, other known I/O devices or a combination of such I/O devices/interfaces 1008. The touch screen may be activated with a writing device or a finger.

The I/O devices/interfaces 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 1008 is configured to provide graphical data to a display for presentation to a user. The graphical data may be representative of one or more graphical user interfaces and/or any other graphical content as may serve a particular implementation.

The computing device 1000 can further include a communication interface 1010. The communication interface 1010 can include hardware, software, or both. The communication interface 1010 can provide one or more interfaces for communication (such as, for example, packet-based communication) between the computing device and one or more other computing devices 1000 or one or more networks. As an example, and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI. The computing device 1000 can further include a bus 1012. The bus 1012 can comprise hardware, software, or both that couples components of computing device 1000 to each other.

In the foregoing specification, the invention has been described with reference to specific example embodiments thereof. Various embodiments and aspects of the invention (s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A method comprising:

receiving, via a user interface of a client device, user selections of a first point and a second point for a path, the first point being at a first position in a digital design document comprising text and the second point being at a second position in the digital design document;

identifying a glyph of the text nearest a location of the first position, wherein the glyph is nearest a location of the second position;

determining a geometry of the glyph;

determining a first parametric value of a first portion of the geometry of the glyph nearest to the first position;

determining a second parametric value of a second portion of the geometry of the glyph nearest to the second position;

generating the path between the first position and the second position that follows the geometry of the glyph at a consistent offset relative to the glyph by utilizing the first parametric value and the second parametric value to generate path geometry that follows the geometry of the glyph;

receiving a third selection via the user interface at a third position in the digital design document;

identifying a second glyph nearest a location of the third position;

determining a second geometry of the second glyph;

determining a third parametric value of the second geometry of the second glyph nearest to the third position; and generating a second path between the second position and the third position that follows the geometry of the glyph and the second geometry of the second glyph based on the second parametric value and the third parametric value.

2. The method of claim 1, further comprising identifying the glyph of the text by:

determining a bounding box for the glyph based on metadata for the glyph; and determining that the first position intersects with the bounding box for the glyph.

3. The method of claim 1, further comprising identifying the glyph of the text by:

accessing a glyph mask for the glyph based on metadata for the glyph; and determining that the first position is within the glyph mask.

4. The method of claim 1, further comprising:

determining whether the second position is within a tolerance of the glyph; and in response to determining that the second position is within the tolerance of the glyph, generating the path between the first position and the second position.

5. The method of claim 1, wherein the second position is within a tolerance of the glyph, further comprising:

determining an updated tolerance by decreasing the tolerance; and in response to determining the second position is not within the updated tolerance, generating a deviated path between the first position and the second position that deviates from the geometry of the glyph.

6. The method of claim 5, further comprising:

determining, based on receiving a fourth selection via the user interface, a fourth position in the digital design document;

determining whether the fourth position is within the tolerance of the second glyph; and in response to determining that the fourth position is not within the tolerance, generating a deviated path between the third position and the fourth position that deviates from the geometry of the second glyph.

7. The method of claim 1, further comprising determining the geometry of the glyph by extracting a glyph outline corresponding to the glyph.

8. The method of claim 1, further comprising generating the path between the first position and the second position by:

determining one or more intermediate parametric values of the geometry of the glyph between the first position and the second position; and generating the path based on the geometry of the glyph based on the one or more intermediate parametric values.

9. The method of claim 1, further comprising generating the path between the first position and the second position by:

generating a path geometry based on an offset and the geometry of the glyph; and generating the path having the path geometry at the offset.

10. A system comprising:

a memory component; and one or more processing devices coupled to the memory component, the one or more processing devices to perform operations comprising:

receiving, via a user interface of a client device, user selections of first and second points for a path, the first point being at a first position relative to a glyph and the second point being at a second position relative to the glyph;

generating a first path between a first position and a second position that follows a geometry of the glyph at a consistent offset relative to the glyph;

receiving, via the user interface of the client device, a user selection of a third point for the path at a third position; and in response to determining that the third position is not within a tolerance of the glyph, generating a second path from the second position to the third position that deviates from the geometry of the glyph.

11. The system of claim 10, further comprising identifying the glyph by:

determining a bounding box for the glyph based on metadata for the glyph; and determining that the first position intersects with the bounding box for the glyph.

12. The system of claim 10, further comprising editing text comprising the glyph, wherein the text comprises live text.

13. The system of claim 10, wherein generating the first path between the first position and the second position comprises:

determining one or more intermediate parametric values of the geometry of the glyph between the first position and the second position; and generating the first path based on the geometry of the glyph based on the one or more intermediate parametric values.

14. The system of claim 10, wherein generating the first path between the first position and the second position comprises:

generating a first path geometry based on an offset and the geometry of the glyph; and generating the first path having the first path geometry at the offset relative to the glyph.

15. The system of claim 10, further comprising determining the tolerance of the glyph based on a distance between the first position and the glyph.

16. A non-transitory computer readable medium storing executable instructions which, when executed by a processing device, cause the processing device to perform operations comprising:

receiving, via a user interface, user selections of a first point and a second point for a path, the first point being at a first position in a digital design document comprising text and the second point being at a second position in the digital design document;

identifying a glyph of the text nearest a location of the first position;

determining a geometry of the glyph;

determining a first parametric value of a first portion of the geometry of the glyph nearest to the first position;

determining a second parametric value of a second portion of the geometry of the glyph nearest to the second position;

determining, in response to a user interaction with an offset element, an offset distance between the glyph and the path;

generating the path between the first position and the second position that follows the geometry of the glyph at a consistent offset relative to the glyph by utilizing the first parametric value and the second parametric value to generate path geometry that follows the geometry of the glyph from the first position to the second position at the offset distance indicated by the user interaction with the offset element;

determining, based on receiving a third selection via the user interface, a third position in the digital design document;

determining that the third position is not within a tolerance of the glyph; and in response to determining that the third position is not within the tolerance, generating a deviated path between the second position and the third position that deviates from the geometry of the glyph.

17. The non-transitory computer readable medium of claim 16, wherein the operations further comprise identifying the glyph of the text by:

determining a bounding box for the glyph based on metadata for the glyph; and determining that the first position intersects with the bounding box for the glyph.

18. The non-transitory computer readable medium of claim 16, wherein the operations further comprise:

receiving a third selection via the user interface at a third position in the digital design document;

identifying a second glyph nearest a location of the third position;

determining a second geometry of the second glyph;

determining a third parametric value of the second geometry of the second glyph nearest to the third position; and generating a second path between the second position and the third position that follows the geometry of the glyph and the second geometry of the second glyph based on the second parametric value and the third parametric value.

19. The non-transitory computer readable medium of claim 16, wherein the operations further comprise:

determining an updated tolerance by increasing the tolerance; and in response to determining third position is within the updated tolerance, updating the deviated path to follow the geometry of the glyph from the second position to the third position at the offset distance.

20. The non-transitory computer readable medium of claim 16, wherein the operations further comprise determining the geometry of the glyph by extracting a glyph outline corresponding to the glyph.

* * * * *